(12) United States Patent
Sonozaki et al.

(10) Patent No.: US 11,133,579 B2
(45) Date of Patent: Sep. 28, 2021

(54) COVER AND VEHICLE-MOUNTED FIN TYPE ANTENNA DEVICE

(71) Applicant: NTN CORPORATION, Osaka (JP)

(72) Inventors: Tomokazu Sonozaki, Mie (JP); Natsuhiko Mori, Mie (JP); Fuminori Satoji, Mie (JP); Katsuo Shibahara, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/649,168

(22) PCT Filed: Oct. 18, 2018

(86) PCT No.: PCT/JP2018/038866
§ 371 (c)(1),
(2) Date: Mar. 20, 2020

(87) PCT Pub. No.: WO2019/078303
PCT Pub. Date: Apr. 25, 2019

(65) Prior Publication Data
US 2020/0295443 A1   Sep. 17, 2020

(30) Foreign Application Priority Data

Oct. 18, 2017 (JP) .............................. JP2017-201930
Sep. 18, 2018 (JP) .............................. JP2018-173742
Oct. 18, 2018 (JP) .............................. JP2018-196689

(51) Int. Cl.
*H01Q 1/32* (2006.01)
*C08G 63/06* (2006.01)
(Continued)

(52) U.S. Cl.
CPC .......... *H01Q 1/3275* (2013.01); *C08G 63/065* (2013.01); *C08G 63/605* (2013.01);
(Continued)

(58) Field of Classification Search
CPC ...... H01Q 1/3275; H01Q 1/3241; H01Q 1/40; H01Q 1/42; H01Q 1/38; C08G 63/605; C08G 63/065
See application file for complete search history.

(56) References Cited

U.S. PATENT DOCUMENTS

2002/0135893 A1   9/2002   Hirose et al.
2009/0280316 A1   11/2009  Lee et al.
(Continued)

FOREIGN PATENT DOCUMENTS

CN   1378203      11/2002
CN   106067600    11/2016
(Continued)

OTHER PUBLICATIONS

International Preliminary Report on Patentability and Written Opinion of the International Searching Authority dated Apr. 21, 2020 in International (PCT) Application No. PCT/JP2018/038866.
(Continued)

*Primary Examiner* — Lam T Mai
(74) *Attorney, Agent, or Firm* — Wenderoth, Lind & Ponack, L.L.P.

(57) ABSTRACT

A vehicle-mounted fin type antenna device 1 includes a plurality of antenna units 5a to 5d, a circuit board 4 electrically connected to the plurality of antenna units 5a to 5d, and a radome 3 accommodating the plurality of antenna units 5a to 5d and the circuit board 4 in an inside of the radome. The radome 3 is formed of a resin material that contains a crystalline resin as a base resin and has a deflection temperature under load of 100° C. or more.

16 Claims, 2 Drawing Sheets (51) Int. Cl.
*C08G 63/60* (2006.01)
*H01Q 1/40* (2006.01)
*H01Q 1/42* (2006.01)

(52) U.S. Cl.
CPC ............. *H01Q 1/3241* (2013.01); *H01Q 1/40* (2013.01); *H01Q 1/42* (2013.01)

(56) References Cited

U.S. PATENT DOCUMENTS

| | | | |
|---|---|---|---|
| 2011/0213077 A1* | 9/2011 | Bertucci | C09K 19/3809 524/605 |
| 2012/0081256 A1 | 4/2012 | Aizawa et al. | |
| 2015/0123854 A1 | 5/2015 | Chakam et al. | |
| 2016/0315378 A1 | 10/2016 | Kiriyama et al. | |
| 2017/0207520 A1 | 7/2017 | Ohno et al. | |
| 2018/0265715 A1* | 9/2018 | Suzuki | C09D 123/26 |
| 2018/0358710 A1 | 12/2018 | Toyao et al. | |
| 2019/0288380 A1 | 9/2019 | Ohno et al. | |
| 2019/0379108 A1 | 12/2019 | Ohno et al. | |
| 2020/0115546 A1* | 4/2020 | Hara | C08K 3/346 |

FOREIGN PATENT DOCUMENTS

| | | |
|---|---|---|
| JP | 2-35803 | 2/1990 |
| JP | 2009-273104 | 11/2009 |
| JP | 2012-80388 | 4/2012 |
| JP | 2012-198537 | 10/2012 |
| JP | 2015-516786 | 6/2015 |
| JP | 2016-25477 | 2/2016 |
| JP | 2016-36104 | 3/2016 |
| JP | 2016-211358 | 12/2016 |
| WO | 2017/086377 | 5/2017 |

OTHER PUBLICATIONS

Office Action dated Dec. 22, 2020 in corresponding Chinese Patent Application No. 201880061808.7, with English translation of Search Report.

International Search Report dated Dec. 18, 2018 in International (PCT) Application No. PCT/JP2018/038866.

* cited by examiner

COVER AND VEHICLE-MOUNTED FIN TYPE ANTENNA DEVICE

TECHNICAL FIELD

The present invention relates to, for example, a cover for electromagnetism/electromagnetic wave generator to be attached to a wall of a house, a cover such as a radome for electromagnetism/electromagnetic wave generator to be attached to a roof of a vehicle, and a fin type antenna device equipped with a cover such as a radome.

BACKGROUND ART

Various antennas for receiving various radio waves are attached to suitable locations of vehicles such as motor vehicles. For example, AM/FM receiving antennas and satellite radio receiving antennas are attached to the roof of vehicles (for example, see Patent Literature 1 below). And keyless entry antennas are attached to the respective doors (for example, see Patent Literature 2 below).

CITATIONS LIST

Patent Literature

Patent Literature 1: JP 2016-25477 A
Patent Literature 2: JP 2016-211358 A

SUMMARY OF INVENTION

Technical Problems

However, as antennas are provided to various parts of a vehicle, the number of cables connecting the respective antennas to the control unit provided in the vehicle increases. Thus, the weight of the vehicle increases, and this leads to a decrease in fuel consumption. Particularly in recent years, the wireless communication functions of vehicles have been diversified, and the kinds of antennas mounted on vehicles have tended to increase. Thus, an increase in the weight of cables extending from the respective antennas is a problem.

Hence, the present inventors have investigated to incorporate a plurality of (for example, four or more) antennas into a fin type antenna device to be provided on the roof of a vehicle. This makes it possible to collect the cables connecting the respective antennas to the control unit together as a single cable, thus the weight of vehicle is saved and a decrease in fuel consumption is achieved.

However, when a plurality of antennas are accommodated in a cover such as a radome of a vehicle-mounted fin type antenna device, the circuit board provided in the cover such as a radome is likely to generate heat, and the electronic components on the circuit board may be deteriorated to have a shorter lifetime. In addition, the temperature inside the cover such as a radome increases, and thus the cover such as a radome may be deteriorated in early stages.

Hence, an object of the present invention is to enhance the durability of a cover such as a radome which accommodates an electromagnetism/electromagnetic wave generator such as a plurality of antennas therein and the durability of a vehicle-mounted fin type antenna device equipped with a cover such as a radome.

Solutions to Problems

In order to solve the above-mentioned problems, the present invention provides a cover formed as a housing that protects an electromagnetism/electromagnetic wave generator and is capable of transmitting electromagnetism/electromagnetic waves generated from the electromagnetism/electromagnetic wave generator, in which the housing is formed of a resin material that contains a crystalline resin as a base resin and has a deflection temperature under load of 100° C. or more. In order to solve the above-mentioned problems, the present invention also provides a vehicle-mounted fin type antenna device including a plurality of antenna units, a circuit board electrically connected to the plurality of antenna units, and a radome accommodating the plurality of antenna units and the circuit board in an inside of the radome, in which the radome is formed of a resin material that contains a crystalline resin as a base resin and has a deflection temperature under load of 100° C. or more.

As a cover such as a radome is formed using a resin material that contains a crystalline resin exhibiting excellent heat resistance as a base resin and has a deflection temperature under load of 100° C. or more in this manner, the strength of the cover such as a radome at high temperatures is guaranteed. Thus, sufficient durability is attained even in a case in which an electromagnetism/electromagnetic wave generator such as a plurality of (particularly four or more) antenna units are accommodated inside the cover such as a radome and under the blazing sun in the summertime. Incidentally, the method for measuring the deflection temperature under load is based on, for example, JIS K7191-1, ASTM-D648, ISO 75-1, and ISO 75-2.

The conventional keyless entry antennas are separately provided on the doors (specifically, left and right front side doors, automatic sliding doors, back doors, hoods, and the like) and the like of a vehicle, and thus the number of cables extending from the respective antennas increases and particularly the weight increases. Accordingly, if the keyless entry antennas are placed together in the radome of the vehicle-mounted fin type antenna device, the number of cables greatly decreases and the effect of weight saving is great.

When a plurality of antenna units are accommodated in the radome as described above, the antenna units come close to each other, and thus the interference between transmitted and received radio waves (electromagnetism/electromagnetic waves) by the respective antenna units is a problem. Accordingly, it is required to accurately dispose the respective antenna units at predetermined positions (particularly, relative positions between the respective antenna units) so that the interference between radio waves does not occur. But the positions of antenna units may be deviated by the vibration and the like at the time of traveling of the vehicle. Hence, if a filler is enclosed inside the radome and a plurality of antenna units are integrally held by this filler, it is possible to prevent the relative position deviation of the respective antenna units and to reliably prevent the interference between the transmitted and received radio waves by the respective antenna units. At this time, the filler is in contact with the antenna units, and it is thus preferable that the filler is a material which does not affect the properties (for example, dielectric constant and dielectric loss tangent) of the antenna units. Examples of such a filler include a foaming material such as urethane.

As the dielectric loss tangents of the filler and resin material are lower, the properties of the electromagnetism/electromagnetic wave generator such as an antenna unit are not affected. Accordingly, the dielectric loss tangent of the filler is preferably, for example, 0.02 or less. Moreover, the dielectric loss tangent of the resin material forming the cover such as a radome is preferably, for example, 0.01 or less. An adverse effect on the properties of the electromagnetism/electromagnetic wave generator such as an antenna unit is avoided by using a filler and a resin material which have a low dielectric loss tangent in this manner. Incidentally, the dielectric loss tangent is determined based on a measurement method defined in, for example, ASTM D150, IEC 60250, and JIS C2138. The optimum measurement method is selected depending on the frequency, but the value does not differ even when the dielectric loss tangent is determined based on any measurement method.

As the crystalline resin to be the base resin of the resin material forming the cover such as a radome, it is possible to use, for example, any of polymethylpentene (PMP), liquid crystal polymer (LCP), polyphenylene sulfide (PPS), or polybutylene terephthalate (PBT). Among these, PMP or LCP is particularly preferable. The density of PMP is extremely low, and thus the weight of the cover such as a radome can be saved. LCP exhibits a property that the orientation is enhanced and the strength increases by being thinned, and weight saving due to a decrease in thickness can be thus achieved while the strength is secured.

The base resin of the resin material forming the cover such as a radome is preferably LCP having a repeating structural unit, for example, represented by the following Chemical Formula 1. This LCP is wholly aromatic polyester-based LCP and exhibits particularly excellent heat resistance.

[Chem. 1]

In this Chemical Formula 1, n represents 0 or 1, and x, y, and z each represent an arbitrary integer.

Moreover, the base resin of the resin material forming the cover such as a radome is preferably LCP having a repeating structural unit, for example, represented by the following Chemical Formula 2. This LCP exhibits proper heat resistance so as to be used as a cover such as a radome and also exhibits preferred electrical properties such as a dielectric loss tangent value so as to be used as a cover such as a radome.

[Chem. 2]

In this Chemical Formula 2, x and y each represent an arbitrary integer.

When the temperature inside the radome increases, a pressure is generated in the radome by the difference between the internal air temperature and the outside air temperature, and this pressure may adversely affect the antenna unit. Hence, the radome of the vehicle-mounted fin type antenna device may be provided with a waterproof-breathable filter that regulates the passage of water but allows the passage of air. It is possible to release heat in the radome to the outside while preventing water and dust from entering the inside of the radome by this waterproof-breathable filter, and it is thus possible to suppress an increase in the temperature inside the radome and to prevent a decrease in performance of the antenna unit.

Advantageous Effects of Invention

As described above, according to the present invention, it is possible to enhance the durability of a cover such as a radome which accommodates an electromagnetism/electromagnetic wave generator such as a plurality of antennas therein and the durability of a vehicle-mounted fin type antenna device equipped with a cover such as a radome.

DESCRIPTION OF EMBODIMENTS

Hereinafter, embodiments of the present invention will be described with reference to the drawings.

Figure 1:
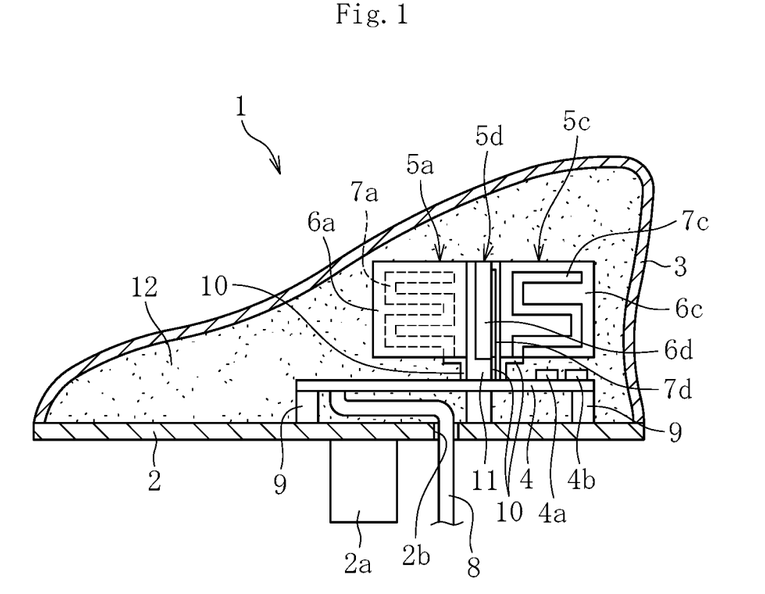
FIG. 1 is a cross-sectional view of a vehicle-mounted fin type antenna device according to an embodiment of the present invention.
Figure 2:
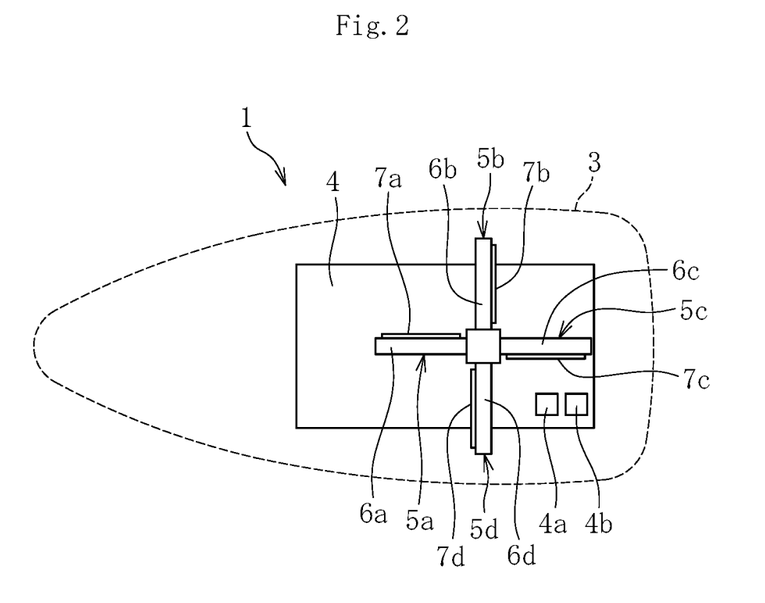
FIG. 2 is a plan view of an antenna unit and a circuit board of the vehicle-mounted fin type antenna device.

A vehicle-mounted fin type antenna device 1 illustrated in FIGS. 1 and 2 mainly includes a base 2 attached to the roof of a vehicle, a fin type radome (cover) 3 attached to the base 2, a plurality of antenna units (electromagnetism/electromagnetic wave generator) accommodated in a space in the radome 3, and a circuit board 4 electrically connected to these. In the present embodiment, the vehicle-mounted fin type antenna device 1 including four antenna units 5a to 5d is described.

The base 2 has a flat plate shape and is formed of, for example, a resin. The lower surface of the base 2 is provided with a fixing portion 2a for fixing the base 2 to the roof of a vehicle. The fixing portion 2a is composed of, for example, a bolt, and the vehicle-mounted fin type antenna device 1 including the base 2 is fixed onto the roof of a vehicle by inserting a bolt into a through hole provided to the roof of a vehicle and fastening this bolt with a nut. The base 2 is provided with a through hole 2b, and a cable 8 for connecting the base 2 to a control unit (not illustrated) provided in the vehicle is inserted into the through hole 2b.

The radome 3 has a fin type outer shape and has an internal space opened downward. The base 2 is fixed to the opening at the lower part of the radome 3 with a sealing member (not illustrated) such as packing interposed therebetween. The radome 3 is formed of a resin material, and the surface (outer surface) thereof is painted.

The radome 3 is required to exhibit various properties such as heat resistance (heat by direct sunlight and heat transfer from the body), weather resistance (wind and rain and dust), ultraviolet resistance (direct sunlight), chemical resistance (detergent, wax, coating agent, and the like), and strength (at the time of car washing by an automatic car washer, collision of foreign substances such as hail and hailstone). Among these, heat resistance and strength are important, and it is particularly required to select the material for the radome 3 in consideration of the strength at a high temperature. In the present embodiment, a crystalline resin exhibiting excellent heat resistance is used as a base resin of the resin material forming the radome 3. Moreover, the kinds and blended amounts of the base resin and additives are set such that the deflection temperature under load is 100° C. or more and preferably 150° C. or more. Hereinafter, specific examples of the material will be described.

As the crystalline resin to be the base resin, it is possible to use, for example, any of polymethylpentene (PMP), liquid crystal polymer (LCP), polyarylene sulfide (PAS) such as polyphenylene sulfide (PPS), or polybutylene terephthalate (PBT).

PMP exhibits excellent oxygen permeability and chemical resistance. PMP has a low density, and the weight of the radome 3 can be thus saved. PMP does not hydrolyze and thus exhibits high water resistance and steam resistance. PMP has a high melting point of about 220° C. to 240° C. (for example, 235° C.), and there is PMP having a deflection temperature under load of 100° C. or more as measured, for example, based on the test method of ASTM-D648 (0.45 MPa), and PMP is thus suitably used in a high-temperature environment.

Moreover, the frequency dependence of dielectric properties of PMP is low. A dielectric loss tangent (tan δ) of PMP measured, for example, based on the test method of ASTM-D150 is 0.0003 or less at both 10 kHz and 1 MHz and is a low value of 0.0008 even at 10 GHz. PMP or a resin material containing PMP is also equipped with electrical properties so as to be sufficiently used as the radome 3 of the vehicle-mounted fin type antenna device 1 in this manner.

For example, the dielectric loss tangent (tan δ) of a phenol resin measured, for example, based on the test method of ASTM-D150 is as high as 0.08 to 0.50 at 50 Hz to 1 MHz. Such a material is not preferable as the resin material for the radome 3 of the vehicle-mounted fin type antenna device 1.

It is more desirable that the dielectric loss tangent (tan δ) of the resin material forming the radome 3 of the vehicle-mounted fin type antenna device 1 is, for example, 0.001 or less by any measurement method and under any frequency condition.

Examples of PMP include those having a repeating structural unit represented by the following Chemical Formula 3.

[Chem. 3]

In this Chemical Formula 3, x represents an arbitrary integer.

LCP exhibits excellent heat resistance, flame retardancy, chemical resistance, gas barrier properties, and vibration-damping properties and has a high strength and a high elastic modulus. LCP has a low coefficient of thermal expansion and exhibits excellent dimensional stability. In addition, LCP exhibits a property that the orientation is enhanced and the strength increases by being thinned, and weight saving can be thus achieved by thinning the radome 3 while the strength is secured.

Examples of LCP include those having a repeating structural unit represented by the following Chemical Formulas 4 to 6. Wholly aromatic polyester-based LCP represented by Chemical Formula 4 is particularly preferable because of excellent heat resistance thereof. LCP exhibits liquid crystallinity in a molten state and thus exhibits favorable fluidity at the time of molding, and the radome 3 can be easily molded even when having a thin shape.

[Chem. 4]

[Chem. 5]

[Chem. 6]

In these Chemical Formulas 4 to 6, n represents 0 or 1 and x, y, and z each represent an arbitrary integer.

A thermotropic liquid crystal polymer, which has attracted particular attention, is melt-moldable, and exhibits anisotropy when being melted, exhibits orientation inherent in liquid crystal, this orientation exerts self-reinforcing property, the heat deformation resistance of the thermotropic liquid crystal polymer itself is thus high, and a small filled amount of a reinforcing agent such as an inorganic heat-resistant fibrous filler or a powdery filler also contributes to the improvement in heat deformation resistance.

In addition, a resin material in which glass fibers and the like are added to LCP represented by Chemical Formula 4 above has a high deflection temperature under load value of, for example, 240° C. or more as measured based on the test method of ASTM-D648 (1.8 MPa). This resin material also exhibits excellent electrical properties such as dielectric properties, and the dielectric loss tangent (tan δ) thereof is a low value of 0.003 to 0.004 at 1 GHz as measured, for example, based on the test method of ASTM-D150.

In addition, a resin material in which glass/inorganic substances, glass fibers and the like are added to LCP represented by Chemical Formula 5 above has a high deflection temperature under load value of, for example, 235° C. or more as measured based on the test method of ISO 75-1 and 2(1.8 MPa). This resin material also exhibits excellent electrical properties such as dielectric properties, and the dielectric loss tangent (tan δ) thereof is a low value of 0.01 at 1 kHz and 0.01 at 1 MHz as measured, for example, based on the test method of IEC 60250.

Incidentally, the relative dielectric constant, dielectric constant, and dielectric loss tangent based on ASTM D150, IEC 60250, and JIS C2138 are described. First, a plate electrode is brought into contact with a plate-like or sheet-like measurement target to fabricate a parallel plate capacitor. Next, the capacitance of the capacitor fabricated is measured, and the relative dielectric constant is calculated. The relative dielectric constant is a ratio of a capacitance Cx of a capacitor fabricated using an insulating material to a capacitance C0 in a case in which the space between the electrodes is filled with vacuum in the same electrode configuration. In addition, the dielectric constant is the product of a relative dielectric constant εr of the insulating material and a dielectric constant ε0 of the vacuum. Moreover, the dielectric loss tangent is read by an LCR meter which is a measuring device. The LCR meter is a device for mainly measuring the parameters of passive components such as inductance (L), capacitance (C), resistance (R), and impedance (Z) at an alternating current.

PAS such as PPS exhibits excellent heat resistance, cold resistance, chemical resistance, creep resistance, weather resistance, and fatigue properties. PAS such as PPS also exhibits excellent flame retardancy and heat shock resistance. PAS such as PPS is also excellent as an insulating material and hardly affects the dielectric constant, dielectric loss tangent and the like of the respective antenna units 5a to 5d even when the frequency changes.

PAS is a synthetic resin generally represented by the following Formula (1). Ar in the following Formula (1) is an arylene group, and examples of Ar include those represented by the following Formulas (2) to (7). Incidentally, in the following Formula (5), X represents a halogen selected from F, Cl, or Br or CH₃ and m represents an integer 1 to 4.

[Chem. 7]

(1)

[Chem. 8]

(2)

[Chem. 9]

As PAS, PPS in which Ar in Formula (1) above is Formula (2) above can be suitably used. In PAS, the percentage content of a repeating unit (—Ar—S—) is preferably 70 mol % or more and more preferably 90 mol % to 100 mol %. The percentage content of a repeating unit used herein refers to the proportion of the repeating unit in 100% of all the monomers constituting PAS. It tends to be difficult to attain stability such as a decrease in dimensional change in the radome 3 based on low water absorbing property when the radome 3 is formed using PAS, in which the percentage content of a repeating unit is less than 70 mol %.

Publicly known methods can be used to obtain PAS. PAS is synthesized by, for example, a reaction between a halogen-substituted aromatic compound and an alkali sulfide (JP 44-27671 B), a condensation reaction of an aromatic compound and sulfur chloride in the presence of a Lewis acid catalyst (JP 46-27255 B), or a condensation reaction of thiophenols in the presence of an alkali catalyst or a copper salt (U.S. Pat. No. 3,274,165 B). As a specific method, sodium sulfide and p-dichlorobenzene are reacted in amide-based solvents such as N-methylpyrrolidone and dimethylacetamide or sulfone-based solvents such as sulfolane.

For example, components represented by the following Formulas (8) to (12) can be contained in PAS as long as the crystallinity of PAS is not affected and can be used as copolymer components. The amount of components represented by the following Formulas (8) to (12) added can be set to less than 30 mol % and preferably to less than 10 mol % and 1 mol % or more with respect to 100% of all the monomers constituting PAS.

[Chem. 10]

[Chem. 11]

Moreover, PAS is preferably of a crosslinked type or has partial cross linkage, that is, has partial crosslinking. PAS having partial cross linkage is also called semi-crosslinked or semi-linear PAS. The molecular weight of crosslinked PAS is increased to a required level by performing a heat treatment in the presence of oxygen during the manufacturing process. In crosslinked PAS, a part of the molecule mutually has a two-dimensional or three-dimensional crosslinked structure through oxygen. For this reason, crosslinked PAS maintains high rigidity even in a high temperature environment as compared with linear PAS to be described next and is excellent in that creep deformation less occurs and stress is hardly alleviated. Crosslinked or semi-crosslinked PAS is superior to linear (non-crosslinked) PAS in heat resistance, creep resistance, and the like in this manner. For this reason, crosslinked or semi-crosslinked PAS has advantages such as less occurrence of burrs in the injection-molded products as compared with linear PAS.

On the other hand, linear PAS does not have a crosslinked structure in the molecule since a heat treatment step is not included in the manufacturing process but the molecule has a one-dimensional linear shape. Generally, linear PAS is characterized in that the rigidity is lower and the toughness and elongation are slightly higher than those of crosslinked PAS. In addition, linear PAS has an excellent mechanical strength in a specific direction. Furthermore, linear PAS has advantages that the dimensional change further less occurs even in a high-temperature and high-humidity atmosphere because of little moisture absorption. In addition, the melt viscosity of linear PAS can be decreased by, for example, adjusting the molecular weight. For this reason, even in the case of a resin composition obtained by mixing a large amount of fillers including a fibrous filler such as glass fibers, a whisker-like filler such as potassium titanate, a flaky filler such as mica, and a powdery filler such as metal powder with linear PAS, the injection moldability thereof is not significantly impaired.

As a method for forming crosslink or partial cross linkage in PAS, for example, there is a method in which a polymer having a low polymerization degree is polymerized and then heated in an atmosphere containing air or a method in which a crosslinking agent and a branching agent are added.

The apparent melt viscosity of PAS is preferably in a range of 1,000 poise or more and 10,000 poise or less. When the apparent melt viscosity is too low (less than 1,000 poise), the strength of the radome 3 may decrease. On the other hand, when the apparent melt viscosity is too high (exceeding 10,000 poise), the moldability may decrease. The melt viscosity of crosslinkable PAS can be set to 1,000 to 5,000 poise and is preferably 2,000 to 4,000 poise. When the melt viscosity is too low, the mechanical properties such as creep resistance may decrease in a high temperature region of 150° C. or more. In addition, when the melt viscosity is too high, the moldability may decrease. Incidentally, the measurement of melt viscosity can be performed using a Koka type flow tester under the conditions in which the measurement temperature is 300° C., the orifice has a hole diameter of 1 mm and a length of 10 mm, the measurement load is 20 kg/cm$^2$, and the preheating time is 6 minutes.

Moreover, as the thermal stability of PAS having partial cross linkage, it is preferable that the rate of change in the melt viscosity after 6 minutes and 30 minutes of preheating is in a range of −50% to 150% under the above conditions for melt viscosity measurement. Incidentally, the rate of change is expressed by the following equation.

[Rate of change=$(P30-P6)/P6 \times 100$ ($P6$: measured value after 6 minutes of preheating, $P30$: measured value after 30 minutes of preheating)]

The molecular weight of PAS is preferably 13,000 to 30,000 in terms of number average molecular weight in consideration of injection moldability and more preferably 18,000 to 25,000 in terms of number average molecular weight in further consideration of fatigue resistance and high molding accuracy. In a case in which the number average molecular weight is less than 13,000, the molecular weight is too low and the fatigue resistance tends to be inferior. On the other hand, in a case in which the number average molecular weight exceeds 30,000, the fatigue resistance is improved but, for example, it is required to contain a fibrous filler such as glass fibers in some cases in order to achieve the required mechanical strength such as impact strength. For example, when glass fibers are contained at 10 mass % to 50 mass %, the melt viscosity at the time of molding exceeds the upper limit (10,000 poise). For this reason, it may be difficult to secure the molding accuracy of the radome 3 at the time of injection molding. Incidentally, the number average molecular weight used herein means a number average molecular weight of PAS in terms of polystyrene measured by gel permeation chromatography (GPC method) after being dissolved in a solvent.

The melting point of PAS is, for example, about 220° C. to 290° C. and preferably 280° C. to 290° C. The melting point of PPS is generally about 285° C., and thus it is preferable to use PPS as PAS. In addition, PAS exhibits low water absorbing property, and thus the dimensional change of the radome 3 formed using PAS as a base material due to water absorption decreases. The radome 3 formed using PAS as a base material exhibits excellent stability that the dimensional change due to water absorption decreases as well as the creep resistance, chemical resistance and the like of the radome 3 are excellent.

Moreover, the deflection temperature under load of a resin material containing PAS such as PPS is, for example, 105° C. or more as measured based on the test method of ISO 75-1 and 2 (1.8 MPa).

Moreover, the deflection temperature under load of a resin material in which glass fibers are added to PAS such as PPS at 40 wt % is, for example, 275° C. as measured based on the test method of ISO 75-1 and 2 (1.8 MPa).

Moreover, PAS such as PPS also exhibits excellent electrical properties such as dielectric properties. A resin material containing PAS such as PPS has a low dielectric loss tangent (tan δ) value of 0.001 to 0.008 as measured based on the test method of IEC60250. Specifically, the dielectric loss tangent (tan δ) of the resin material containing PAS such as PPS is a low value of 0.001 even at 1 MHz.

Moreover, the dielectric loss tangent (tan δ) of the resin material in which glass fibers are added to PAS such as PPS at 40 wt % is a low value of 0.001 at 1 kHz and 0.002 at 1 MHz as measured based on the test method of IEC60250.

The resin material containing PAS such as PPS is also equipped with electrical properties so as not to cause any problem even when being used as the radome 3 of the vehicle-mounted fin type antenna device 1 in this manner.

PBT exhibits favorable dimensional stability, thermal stability, and chemical resistance (acid resistance and alkali resistance). PBT exhibits balanced physical properties including electrical properties.

For example, the deflection temperature under load of a resin material in which glass fibers are added to PBT at 15 wt % is, for example, 200° C. as measured based on the test method of ISO 75-1 and 2 (1.8 MPa).

Moreover, the dielectric loss tangent (tan δ) of the resin material in which glass fibers are added to PBT at 15 wt % is a value of 0.002 at 50 Hz as measured based on the test method of ASTM-D150. The resin material containing PBT has a little change in dielectric properties over a wide temperature range and is less affected by frequency.

Examples of PBT include those having a repeating structural unit represented by the following Chemical Formula 12.

[Chem. 12]

In this Chemical Formula 12, x represents an arbitrary integer.

As the additives, for example, one or more selected from a fibrous filler such as glass fibers, a whisker-like filler such as potassium titanate, a flaky filler such as mica, or a powdery filler such as metal powder can be used. Incidentally, the radome 3 may be formed of a resin material containing only a base resin without being mixed with the additives unless otherwise required.

The circuit board 4 is fixed onto the base 2 with a pedestal 9 interposed therebetween. On the circuit board 4, a circuit pattern (not illustrated) including an amplifier 4a, a control chip 4b (filter) and the like is formed. The respective antenna units 5a to 5d are connected to one end of the circuit pattern through a conductive member 10, and the cable 8 is connected to the other end of the circuit pattern.

The antenna units 5a to 5d each transmit and receive (including reception only or transmission only) radio waves in different frequency bands. Specifically, for example, four kinds of antennas selected from electromagnetism/electromagnetic wave generators such as an AM/FM receiving antenna, a 3G/4G (LTE) communication antenna, a satellite radio receiving antenna, a GPS antenna, a wireless LAN antenna, an inter-vehicle communication antenna, a keyless entry antenna, a Bluetooth (registered trademark) antenna, and an ETC antenna are accommodated in the radome 3. These electromagnetism/electromagnetic wave generators are supposed to mainly transmit and receive, for example, electromagnetism/electromagnetic waves other than visible light, but electromagnetism/electromagnetic wave generators capable of transmitting and receiving electromagnetism/electromagnetic waves including visible light may be used.

The respective antenna units 5a to 5d include flat substrates 6a to 6d and antenna patterns 7a to 7d provided on the surfaces of the respective substrates 6a to 6d. The substrates 6a to 6d are formed of a dielectric material and are formed of, for example, a resin or a ceramic. The antenna patterns 7a to 7d are formed of a thin conductive plate (for example, a metal plate) and are attached to the substrates 6a to 6d. In the present embodiment, the antenna patterns 7a to 7d are provided on the surfaces of the flat substrates 6a to 6d. The antenna patterns 7a to 7d of the respective antenna units 5a to 5d have different shapes from each other. One end of the respective antenna patterns 7a to 7d is electrically connected to the circuit pattern on the circuit board 4 through the conductive member 10. Incidentally, in the illustrated example, the flat antenna units 5a to 5d are all erected, but the present invention is not limited to this, and a part of the antenna units 5a to 5d may be placed flat (disposed in parallel to the base 2). In addition, in the illustrated example, the substrates 6a to 6d of the respective antenna units 5a to 5d have the same shape as each other, but the shapes and sizes of the substrates 6a to 6d may be differentiated from each other.

In the present embodiment, the flat antenna units 5a to 5d are erectly provided. Specifically, the substrates 6a to 6d of the respective antenna units 5a to 5d are fixed to a support 11 erected on the base 2, and the respective antenna units 5a to 5d are provided radially around the support 11. In the illustrated example, four flat antenna units 5a to 5d are disposed so as to form a cross shape in plan view. Incidentally, the plurality of antenna units 5a to 5d may be fixed to the radome 3 side.

As described above, by accommodating the plurality of antenna units 5a to 5d inside the radome 3, these antenna units 5a to 5d and the cable 8 connecting the antenna units 5a to 5d to the control unit provided on the vehicle body side can be collected together. Particularly, in the present embodiment, the signals received by the respective antenna units 5a to 5d are transmitted to the control unit through the common cable 8. By connecting the vehicle-mounted fin type antenna device 1 to the control unit through a small number of cables 8 (one cable in the present embodiment) in this manner, it is possible to decrease the weight of cables, to achieve weight saving of the vehicle, and thus to achieve low fuel consumption.

When a plurality of (particularly four or more) antenna units 5a to 5d are accommodated inside the radome 3 in this manner, the control chip 4b and the like of the circuit board 4 connected to the antenna units 5a to 5d are likely to generate heat and thus the temperature inside the radome 3 increases high in some cases. In such a case, the heat resistance of the radome 3 is particularly important. In the present embodiment, the radome 3 is formed of a resin material containing a crystalline resin exhibiting excellent heat resistance as a base resin and the composition of this resin material is set such that the deflection temperature under load is 100° C. or more as described above. Hence, the heat resistance of the radome 3, particularly the strength at high temperatures, is guaranteed, and thus the radome 3 exhibits excellent durability even in the case of accommodating a plurality of (particularly, four or more) antenna units therein.

A filler 12 is enclosed inside the radome 3. The filler 12 is provided so as to be in contact with all the antenna units 5a to 5d accommodated in the radome 3 and holds all the antenna units 5a to 5d integrally. In the present embodiment, the respective antenna units 5a to 5d are entirely covered with the filler 12, and the entire inner space of the radome 3 is filled with the filler 12 in the illustrated example. Incidentally, the filler 12 may be partially provided inside the radome 3 and all the antenna units 5a to 5d may be held by this filler 12. At this time, the filler 12 may be in partial contact with the respective antenna units 5a to 5d.

In a case in which a plurality of antenna units 5a to 5d are accommodated inside the radome 3 as described above, the antenna units 5a to 5d come close to each other and thus radio waves transmitted and received by the respective antenna units 5a to 5d may interfere with each other. It is required to accurately dispose the respective antenna units 5a to 5b at predetermined positions in the radome 3 so that such interference between radio waves does not occur. In the present embodiment, interference between radio waves transmitted and received by the respective antenna units 5a to 5d is prevented by erectly disposing the respective flat antenna units 5a to 5b in a cross shape in plan view. In the present embodiment, position deviation of the respective antenna units 5a to 5d due to vibration and the like at the time of traveling of the vehicle is prevented by enclosing the filler 12 inside the radome 3 and holding all the antenna units 5a to 5d integrally by this filler 12.

The filler 12 is preferably a material which hardly affects the properties (dielectric constant, dielectric loss tangent, and the like) of the antenna units 5a to 5d since the filler 12 is in contact with the respective antenna units 5a to 5d as described above. For example, a foaming material has a relative dielectric constant close to that of air, hardly affects the properties of the antenna units 5a to 5d, and thus can be suitably used as the filler 12. As the foaming material, a chemical foaming material and a physical foaming material can be used. It is easy to handle chemical foaming agents since the decomposition temperatures thereof are approximately 140° C. to 160° C. Physical foaming agents have low thermal conductivities and exhibit excellent thermal insulating properties. In addition to these, a supercritical fluid, a thermal expandable microcapsule, and the like can also be used as the filler 12. Specifically, the filler 12 can be formed of, for example, urethane foam. A relative dielectric constant ($\epsilon\epsilon$) of urethane foam is 4.0 to 7.5. In addition, the dielectric loss tangent (tan δ) of urethane foam is a low value of 0.015 to 0.017 at, for example, 60 Hz.

The vehicle-mounted fin type antenna device 1 is manufactured, for example, through the following procedure. First, the antenna units 5a to 5d and the circuit board 4 are attached to the base 2 and then the base and the radome 3 are fixed to accommodate the antenna units 5a to 5d and the like inside the radome 3. Thereafter, the filler 12 is injected into the radome 3, and the antenna units 5a to 5d are integrally held by the filler 12. The filler 12 is injected, for example, through an injection port (not illustrated) provided to the base 2. After the filler 12 has been injected, the injection port of the base 2 is sealed with a sealing member (not illustrated). Incidentally, the filler 12 may be injected through a hole originally provided to the base 2. Moreover, the method for manufacturing the vehicle-mounted fin type antenna device 1 is not limited to the above. For example, a plurality of antenna units and a circuit board may be attached to the base 2, then a plurality of antenna units may be integrally held by a filler, and then the radome 3 and the base may be fixed.

Figure 3:
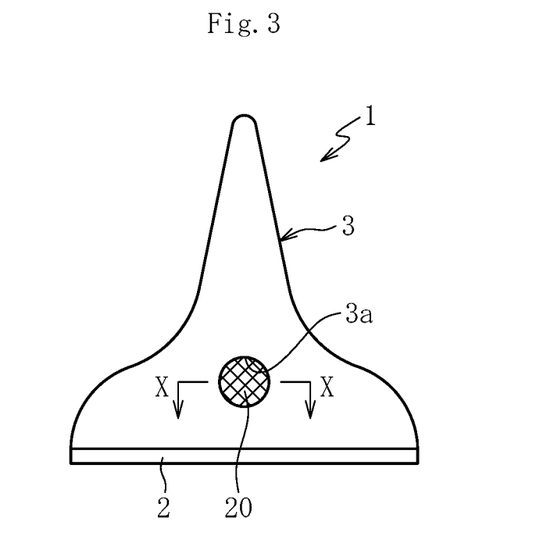
FIG. 3 is a rear view of a vehicle-mounted fin type antenna device according to another embodiment.
Figure 4:
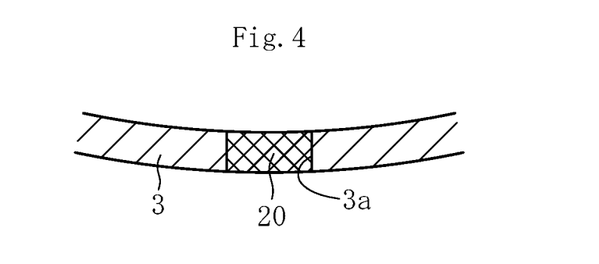
FIG. 4 is a cross-sectional view taken along line X-X in FIG. 3.

The present invention is not limited to the embodiment described above. For example, as illustrated in FIGS. 3 and 4, the radome 3 may be provided with a waterproof-breathable filter 20. The waterproof-breathable filter 20 is provided at a position at which the inside and the outside of the radome 3 communicate with each other. For example, the waterproof-breathable filter 20 is disposed in a through hole 3a provided to the radome 3. In the illustrated example, the waterproof-breathable filter 20 is provided on the side surface (rear surface) on the vehicle rear side of the radome 3. The waterproof-breathable filter 20 regulates the passage of water but allows the passage of air. As the waterproof-breathable filter 20, for example, a porous membrane having a myriad of fine pores can be used. Specifically, a fluororesin porous membrane, a fluororesin nanofiber nonwoven fabric, and the like can be used. An increase in internal temperature of the radome 3 is suppressed by discharging the air (heat) inside the radome 3 to the outside through this waterproof-breathable filter 20. This decreases the difference between the internal air temperature of the radome 3 and the outside air temperature, thus the pressure caused by the temperature difference between the inside and outside of the radome 3 is suppressed and a decrease in performance of the antenna units 5a to 5d due to this pressure can be prevented. Moreover, external water and dust are blocked by the waterproof-breathable filter 20 and thus do not enter the inside of the radome 3.

Moreover, in the embodiment described above, the vehicle-mounted fin type antenna device 1 including four antenna units 5a to 5d has been described, but the present invention is not limited to this. The present invention can be applied to vehicle-mounted fin type antenna devices having two to three antenna units or five or more antenna units as well.

REFERENCE SIGNS LIST

1 Vehicle-mounted fin type antenna device
2 Base
3 Radome (cover)
4 Circuit board 5a-5d Antenna unit (electromagnetism/electromagnetic wave generator)
6a-6d Substrate
7a-7d Antenna pattern
8 Cable
12 Filler
20 Waterproof-breathable filter

The invention claimed is:

1. A cover formed as a housing that protects an electromagnetism/electromagnetic wave generator and is capable of transmitting electromagnetism/electromagnetic waves generated from the electromagnetism/electromagnetic wave generator, wherein
the housing is formed of a resin material that contains a crystalline resin as a base resin and has a deflection temperature under load of 100° C. or more.

2. The cover according to claim 1, further comprising a dielectric loss tangent of the resin material is 0.01 or less.

3. The cover according to claim 1, wherein the base resin of the resin material is any of PMP, LCP, PPS, or PBT.

4. The cover according to claim 1, wherein the base resin of the resin material is LCP having a repeating structural unit represented by the following Chemical Formula 1,

[Chem. 1]

wherein, in this Chemical Formula 1, n represents 0 or 1, and x, y, and z each represent an arbitrary integer.

5. The cover according to claim 1, wherein the base resin of the resin material is LCP having a repeating structural unit represented by the following Chemical Formula 2,

[Chem. 2]

wherein, in this Chemical Formula 2, x and y each represent an arbitrary integer.

6. A vehicle-mounted fin type antenna device comprising a plurality of antenna units; a circuit board electrically connected to the plurality of antenna units; and a radome accommodating the plurality of antenna units and the circuit board in an inside of the radome, wherein
the radome is formed of a resin material that contains a crystalline resin as a base resin and has a deflection temperature under load of 100° C. or more.

7. The vehicle-mounted fin type antenna device according to claim 6, wherein the plurality of antenna units are four or more.

8. The vehicle-mounted fin type antenna device according to claim 6, wherein the plurality of antenna units include a keyless entry antenna unit.

9. The vehicle-mounted fin type antenna device according to claim 6, further comprising a filler is enclosed inside the radome and the plurality of antenna units are integrally held by the filler.

10. The vehicle-mounted fin type antenna device according to claim 9, wherein the filler is formed of a foaming material.

11. The vehicle-mounted fin type antenna device according to claim 9, further comprising a dielectric loss tangent of the filler is 0.02 or less.

12. The vehicle-mounted fin type antenna device according to claim 6, further comprising a dielectric loss tangent of the resin material is 0.01 or less.

13. The vehicle-mounted fin type antenna device according to claim 6, wherein the base resin of the resin material is any of PMP, LCP, PPS, or PBT.

14. The vehicle-mounted fin type antenna device according to claim 6, wherein the base resin of the resin material is LCP having a repeating structural unit represented by the following Chemical Formula 3,

[Chem. 3]

wherein, in this Chemical Formula 3, n represents 0 or 1, and x, y, and z each represent an arbitrary integer.

15. The vehicle-mounted fin type antenna device according to claim 6, wherein the base resin of the resin material is LCP having a repeating structural unit represented by the following Chemical Formula 4,

[Chem. 4]

wherein, in this Chemical Formula 4, x and y each represent an arbitrary integer.

16. The vehicle-mounted fin type antenna device according to claim 6, wherein the radome is provided with a waterproof-breathable filter.

* * * * *